(12) United States Patent
Spaniol

(10) Patent No.: US 7,994,692 B2
(45) Date of Patent: Aug. 9, 2011

(54) WIRE AND FRAME, IN PARTICULAR NIOBIUM-BASED, FOR SINGLE-SIDE SOCKET LAMPS AND A METHOD FOR THE PRODUCTION AND USE THEREOF

(75) Inventor: Bernd Spaniol, Hammersbach (DE)

(73) Assignee: W. C. Heraeus GmbH, Hanau (DE)

( * ) Notice: Subject to any disclaimer, the term of this patent is extended or adjusted under 35 U.S.C. 154(b) by 619 days.

(21) Appl. No.: 12/063,272

(22) PCT Filed: Aug. 11, 2006

(86) PCT No.: PCT/EP2006/007952
§ 371 (c)(1), (2), (4) Date: Mar. 26, 2008

(87) PCT Pub. No.: WO2007/020014
PCT Pub. Date: Feb. 22, 2007

(65) Prior Publication Data
US 2010/0141181 A1 Jun. 10, 2010

(30) Foreign Application Priority Data

Aug. 12, 2005 (DE) .......................... 10 2005 038 551

(51) Int. Cl.
*H01J 7/24* (2006.01)
(52) U.S. Cl. ............................ 313/42; 420/426; 420/427
(58) Field of Classification Search .......... 420/425–427; 148/422; 313/42
See application file for complete search history.

(56) References Cited

U.S. PATENT DOCUMENTS

| 3,780,331 A | * | 12/1973 | Knochel et al. | ............... 313/626 |
| 3,825,802 A | | 7/1974 | Kumagai et al. | |
| 3,882,346 A | | 5/1975 | McVey | |
| 5,171,379 A | | 12/1992 | Kumar et al. | |
| 6,193,779 B1 | * | 2/2001 | Reichert et al. | ................. 75/343 |
| 6,326,726 B1 | | 12/2001 | Mizutani et al. | |

FOREIGN PATENT DOCUMENTS

| DE | 10 2004 011 214 | 10/2005 |
| EP | 1 043 753 | 10/2000 |
| EP | 1 571 228 | 9/2005 |

* cited by examiner

*Primary Examiner* — Joseph L Williams
*Assistant Examiner* — Andrew J Coughlin
(74) *Attorney, Agent, or Firm* — Norris McLaughlin & Marcus, P.A.

(57) ABSTRACT

A highly heat resistant wire based on niobium or tantalum or niobium tantalum alloy for single-side socket lamps is enriched, according to the invention, with phosphorus and converted into an annealed state. The wire exhibits a yield strength Rp 0.2 of at least 200 MPa or a tensile strength Rm of at least 300 MPa. For the production of a frame for single-side socket lamps, a metal based on niobium or tantalum or an alloy thereof is doped with phosphorus and the doped metal is cold shaped into a wire, this wire is annealed and formed into a frame. This frame is used for the simultaneous current supply and holding of a burner in a single-side socket lamp.

4 Claims, No Drawings

WIRE AND FRAME, IN PARTICULAR NIOBIUM-BASED, FOR SINGLE-SIDE SOCKET LAMPS AND A METHOD FOR THE PRODUCTION AND USE THEREOF

This application is a 371 of PCT/EP2006/007952, filed Aug. 11, 2006, which claims foreign priority benefit under 35 U.S.C. §119 of the German Patent Application No. 10 2005 038 551.6 filed Aug. 12, 2005.

The present invention relates to frames, in particular niobium-based, for single-side socket lamps, wires suitable for use for frames, the use of such a frame as holding device and the current supply for a burner as well as a process for the manufacture of a single-side socket lamp with a frame.

Conventionally, frames for single-side socket lamps consist of niobium and an improved design according to ASTM B392 of niobium-zirconium alloys with 1% zirconium (NbZr1). On the one hand, the frame has the task of holding the burner and, on the other hand, of supplying it with current. The shadow which is caused by the wire passing along the burner is undesirable. For commercial applications, there are wires with diameters of 1.2 mm, 1 mm, 0.72 mm, 0.5 mm and 0.35 mm, depending on the burner dimension.

U.S. Pat. No. 6,326,726 B1 describes a wire frame of stainless steel of spring hardness, if necessary plated with nickel.

U.S. Pat. No. 3,882,346 describes a metal frame for single-side socket lamps.

It is the object of the present invention to save material, to reduce the shadow and to provide a wire resistant to high temperatures.

To achieve the object, the yield strength or tensile strength of the frame is improved. On increasing these parameters intended for room temperature, a greater stability of the material at temperatures above 1000° C. is determined. Although the shadow could be reduced by thinner frames of a much more costly tantalum tungsten alloy with 2.5 to 10% by weight of W, the weight of the frame could not.

The solutions are described hereinbelow.

The invention relates to a frame for single-side socket lamps with a reduced diameter and wires suitable therefor. Suitable wires are high heat resistant niobium-based or tantalum-based wires with improved mechanical properties at temperatures above 1000° C. which are achieved by the wire material being enriched with phosphorus and, in particular, converted into an annealed state and/or characterised by a yield strength Rp 0.2 of at least 200 MPa or a tensile strength Rm of at least 300 MPa.

According to the invention, it was possible to substantially increase the yield strength and the tensile strength of niobium, tantalum and alloys based on niobium or tantalum by doping with phosphorus. This applies in particular to material in a state in which inner tensions have built up as a result of recrystallisation which state is created by annealing. According to the invention, yield strengths Rp 0.2 of more than 150 MPa, in particular more than 200 MPa, and preferably more than 250 MPa, are provided for a wire de-stressed by annealing or a frame, formed therefrom, based on niobium or tantalum. The tensile strengths Rm achievable according to the invention amount in the de-stressed (annealed) state to more than 250 MPa, in particular more than 300 MPa, measured, for example, on a frame having a diameter of 0.5 mm. According to the invention, it is possible according to the not yet published DE 10 2004 011 214, to form a frame from the wire of phosphorus-doped niobium. This wire or the frame formed from this wire needs to be de-stressed in order to achieve mechanical properties according to the invention. Annealing is suitable for distressing. In this connection, the annealed state means a recrystallised state following the degradation of inner tensions of the no longer annealed wire. Apart from the improved yield strength and tensile strength, the mechanical properties of the phosphorus-doped niobium are, moreover, improved in that shaping is reduced by winding the wire onto a spool.

In this way, it is possible by doping niobium or niobium-based metals with phosphorus to supersede the excellent mechanical high temperature properties of costly tantalum. In spite of its low yield strength Rp 0.2 of 140 MPa and tensile strength, tantalum has better mechanical high temperature properties. Metals based on tantalum, having a yield strength of 150 MPa and above or a tensile strength of 200 and above exhibit considerably improved mechanical properties at between 1000 and 2000° C. If the costly tantalum is partially replaced by niobium, the mechanical properties change up to the maximum temperature resistance only slightly up to a proportion of approximately 50% niobium. With a niobium content of 70% and more, the difference in comparison with niobium becomes slight.

Further alloy components, in particular refractory metals, may have a clearly positive effect. Zr, Hf, Ta, Mo and W are suitable for improving the mechanical properties of niobium at above 1000° C. For Zr, Hf, Mo and W, 0.5 to 2% by weight have proved suitable. Such alloys are cold shapeable and loose this characteristic with an increasing content of Mo or W.

Ta contributes, as alloy component, only in the region of a content higher by around one order of magnitude to the substantial improvement of the mechanical properties, the alloys of Ta and niobium always exhibiting improved mechanical properties, in particular in the high temperature range, in comparison with the individual components.

Niobium tantalum alloys, too, or tantalum as such can exhibit advantageous effects as a result of further alloy components, in particular refractory metals. Zr, Hf, Mo and W are suitable for improving the mechanical properties of the niobium tantalum alloys or tantalum as such at above 1000° C. For Zr, Hf, Mo and W, 0.5 to 2% by weight have proved suitable. Such alloys are cold shapeable and lose this characteristic with an increasing content of Mo or W.

The effects of these metals on the yield strength and tensile strength are in region of 30 MPa in the case of a proportion of alloy of up to 1%. Additional doping with 100 to 500 ppm phosphorus allows an increase in the yield strength and tensile strength of more than 100 MPa.

The yield strength and the tensile strength are defined in DIN EN 10002-1 "Tensile test at room temperature".

Of great importance for wires drawn at room temperature (cold shaping) is also final annealing for recrystallisation of the wires.

Niobium-based or tantalum-based wires with a yield strength between 200 and 500 MPa or a tensile strength between 300 and 600 MPa exhibit mechanical high temperature properties which have been improved such that frames with diameters 65-75% and more smaller than conventional ones are possible without loss of stability with simultaneous savings in material of 25 to 50% by weight. The shadow is reduced to at least the same extent as the diameter of the wire. Regarding the other properties, the frames according to the invention are at least equivalent in comparison with the known frames. In the case of tantalum-based metals, yield strengths of 150 MPa or tensile strengths of 250 MPa are sufficient for good mechanical properties at above 1000° C.

The limit of doping with P is set by a reduction in the cold shapeability with a rising P content.

With P contents within the order of magnitude of a few percent, neither cold shaping nor warm shaping is possible.

The frames are formed from these wires which are based, on the one hand, on niobium or tantalum and, on the other hand, exhibit a yield strength of at least 200 MPa or a tensile strength of at least 300 MPa. In the case of tantalum-based metals, yield strengths of 150 MPa or tensile strengths of 250 MPa are sufficient.

Preferably, these wires based on niobium or tantalum contain:
- phosphorus, in particular 100 to 2000 ppm or
- at least one further refractory metal, in particular of side groups 4 to 6, the content of Zr, Hf, Mo or W being preferably 0.5 to 2% by weight and particularly preferably 0.8 to 1.5% by weight or
- at least 95% by weight Nb or Ta or Nb and Ta.

For shaping of the frames from the wires, bending and welding is suitable. The proven form of the frame is gallows shaped.

In an analogous manner, the mechanical properties of tantalum and tantalum niobium alloys can be improved by doping with phosphorus.

According to the invention, it has been found that the mechanical properties of the frame wires are satisfactory at above 1000° C., to keep a burner stable in its position over the useful life of a lamp insofar as the tensile strength or yield strength measured at room temperature is achieved with the metal alloys according to the invention. According to the invention, it is thus not the properties at room temperature which are important but the properties of these materials at above 1000° C. It is of major importance that the base material consists of niobium or tantalum or an alloy thereof which is preferably alloyed with subordinate quantities of zirconium, hafnium, molybdenum or tungsten. Preferably, the base material amounts to far more than 90% by weight.

The frame material according to the invention is preferably cold shapeable. This requirement limits the alloying addition of molybdenum, tungsten and rhenium. Alloys of niobium and tantalum exhibit a stability improved vis-a-vis the pure metals. However, this effect is of practical importance only with a tantalum content of more than 10% by weight tantalum.

Inventive dopings of the base material with 100 to 2000 ppm of phosphorus are carried out by:
- electron beam melting by adding P or P-containing prealloys or
- light arc melting by the addition of P or P-containing pre-alloys or
- sinter block production from Nb powders by the addition of P or P-containing prealloys or
- sinter block manufacture from Nb powder already doped with P.

In the following, the invention will be made clearer by way of examples and with reference to the illustrations.

9400 g of Nb and 600 g of P are melted under protective gas in a light arc furnace under protective gas to form a prealloy. The prealloy is very hard and so brittle that it is not shapeable even at 1600° C.

A niobium melt block is doped with P by a homogeneous addition of a prealloy containing 6% phosphorus using electron beam melting such that a niobium ally with 100 to 2000 pg/g of phosphorus is obtained. A niobium alloy thus produced with 350±50 ppm of phosphorus is drawn at room temperature to form wires with a diameter of 0.84 mm, 0.72 mm, 0.5, 0.35 mm, 0.24 mm and 0.13 mm.

The 0.84 mm wire according to the invention replaces the commercial 1.2 mm wire;

The 0.72 mm wire according to the invention replaces the commercial 1 mm wire;

The 0.5 mm wire according to the invention replaces the commercial 0.72 mm wire;

The 0.35 mm wire according to the invention replaces the commercial 0.5 mm wire, The 0.24 mm wire according to the invention replaces the commercial 0.35 mm wire;

The 0.13 mm wire according to the invention is provided for particularly light burners.

Regarding the shape, the frame remains unchanged in comparison with standard frames, with the exception of the wire diameter. The material used was consequently reduced to 60%. The shadow was reduced by 22%.

The wires concerned are annealed during which process an entropy reduction occurs such that the wires are recrystallised during annealing. The recrystallised wires have the desired properties according to the invention. They can be formed into gallows-type frames. For this purpose, they are bent or welded. The gallows-type frames are welded with Mo foil 7 and the connecting rod 2.

Table of Test Results

|  | Yield strength [MPa] | Tensile strength [MPa] | Elongation $A_L$ 254 |
|---|---|---|---|
| Nb | 170 | 280 | 20 |
| NbZr1 | 130 | 280 | 28 |
| Nb with 350 ± 50 ppm P | 270 | 375 | 25 |

By way of the example of doping with 350 pg/g P, a yield strength of 270 MPa is achieved in the annealed state. During this process, the mechanical properties are improved at temperatures above 1000° C. in such a way that 75% of the diameter in comparison with the frame of conventional NbZr1% is sufficient for the frame.

With higher levels of P doping of up to 2000 pg/g, further increases in the yield strength can be achieved. With a yield strength of 500 MPa, a reduction of the diameter to less than 65% is achievable. This leads to savings of materials of more than 50% by weight.

An embodiment of the present invention includes a ceramic burner held on one side by a frame within a glass cylinder. The operating conditions prevailing within the glass sphere are characterised by a high temperature of the burner, the emitted light and the elimination of external atmospheric conditions. The burner itself is electrically and mechanically connected via connecting pins. The connecting pins consist of the same material as the frame or remain alternatively unchanged. A glass duct of molybdenum foil and external connecting pins of molybdenum are used in connection with a gas-tight crimp connection. The frame and the connecting pin serve to provide the electrical current supply to the burner, on the one hand, and to fix and/or hold the burner mechanically in the lamp, on the other hand. According to the invention, a particularly thin frame is provided for this purpose which satisfies the electrical and mechanical requirements and consequently leads to material savings which in turn are accompanied by a reduction of the shadow.

The invention claimed is:

1. A high heat resistant wire, said wire consisting of (i) one of niobium, tantalum and niobium-tantalum alloy and (ii) phosphorus, wherein the wire has been enriched by doping with 100 to 2000 ppm phosphorus and converted to an annealed state, and wherein the wire exhibits a yield strength Rp 0.2 of at least 200 MPa or a tensile strength Rm of at least 300 MPa.

2. Frame for a single-side socket lamp, said frame being formed of a wire according to claim 1.

3. A high heat resistant wire, said wire being composed of one of niobium, tantalum and niobium-tantalum alloy, wherein the wire contains at least 95% by weight of one of niobium, tantalum and niobium-tantalum alloy, wherein the wire contains at least one further refractory metal selected from the group consisting of Zr, Hf, Mo and W, the content of Zr, Hf, Mo or W being 0.5 to 2% by weight, wherein the wire has been enriched by doping 100 to 2000 ppm phosphorus and converted to an annealed state, and wherein the wire exhibits a yield strength Rp 0.2 of at least 200 MPa or a tensile strength Rm of at least 300 MPa.

4. Frame for a single-side socket lamp, said frame being formed of a wire according to claim 3.

\* \* \* \* \*

UNITED STATES PATENT AND TRADEMARK OFFICE
CERTIFICATE OF CORRECTION

| | | |
|---|---|---|
| PATENT NO. | : 7,994,692 B2 | Page 1 of 1 |
| APPLICATION NO. | : 12/063272 | |
| DATED | : August 9, 2011 | |
| INVENTOR(S) | : Spaniol | |

It is certified that error appears in the above-identified patent and that said Letters Patent is hereby corrected as shown below:

In the Specification

Column 3, line 62, "pg/g" – should read -- µg/g --.

Column 4, line 33, "pg/g" – should read -- µg/g --.

Column 4, line 39, "pg/g" – should read -- µg/g --.

Signed and Sealed this
Twenty-fifth Day of March, 2014

Michelle K. Lee
*Deputy Director of the United States Patent and Trademark Office*